United States Patent [19]

Bird

[11] Patent Number: 5,311,393
[45] Date of Patent: May 10, 1994

[54] TRANSIENT VOLTAGE SURGE SUPPRESSOR WITH $I^2R/I^2T$ OVERCURRENT PROTECTION SWITCH

[75] Inventor: Anthony O. Bird, Melbourne, Fla.
[73] Assignee: Atlantic Sientific Corporation, Melbourne, Fla.
[21] Appl. No.: 865,307
[22] Filed: Apr. 8, 1992
[51] Int. Cl.$^5$ ............................................... H02H 5/04
[52] U.S. Cl. ..................... 361/104; 361/55; 361/102; 337/144; 337/190; 337/239
[58] Field of Search ..................... 361/111, 56, 55, 58, 361/102, 167, 104; 337/144, 178, 190, 239

[56] References Cited
U.S. PATENT DOCUMENTS
4,389,695 6/1983 Carpenter, Jr. ..................... 361/104

*Primary Examiner*—Todd DeBoer
*Attorney, Agent, or Firm*—Charles Wands

[57] ABSTRACT

A transient voltage surge suppressor comprises a first series circuit formed of a normally-off voltage surge-responsive gas discharge tube and a first voltage clamping device connected across input terminals to which a line voltage is applied. It also includes a second series circuit formed of a first electrical energy absorbing impedance element and a second voltage clamping device connected across the first voltage clamping element, thereby forming a voltage-clamping, voltage divider circuit which clamps the voltage across the first voltage clamping element at a voltage level reduced in comparison with that obtained by the first series circuit alone. When the gas discharge tube turns on, it places both voltage clamping devices in the circuit simultaneously, so that the let-through voltage appearing across output terminals can be reduced to the voltage clamped by the voltage-clamping, voltage divider circuit. An overcurrent protection device is coupled in circuit with the surge suppressor circuit to prevent damage to the surge suppressor that may be caused by excessive thermal energy buildup or by a large magnitude current spike capable of destroying one or more components of the suppressor and thereby preventing the suppressor from performing its intended function. The overcurrent protection device comprises a pair of series-connected switches, physically configured as alterable conductor portions, so that severing either of the conductor portions will effectively decouple the line terminals from the surge suppressor circuit.

17 Claims, 4 Drawing Sheets

TRANSIENT VOLTAGE SURGE SUPPRESSOR WITH I²R/I²T OVERCURRENT PROTECTION SWITCH

FIELD OF THE INVENTION

The present invention relates in general to devices for protecting electrical and electronic equipment and appliances from the effects of voltage surges on a power supply line to which they are connected, and is particularly directed to an improved transient voltage surge suppressor, and a condition-responsive release mechanism through which the transient voltage surge suppressor is controllably decoupled from the voltage line in the event of a potentially destructive electrical energy anomaly.

BACKGROUND OF THE INVENTION

Current state of the art electrical energy surge suppressors, such as AC outlet-mounted devices and stand alone devices, to which the power supply leads of one or more electrical appliances or electronic equipments are connectable, customarily include one or more interconnected passive, series impedances, such as inductors, and one or more non-linear voltage-limiting elements, such as gas discharge tubes, metal oxide varistors (MOVs), and solid state devices, such as silicon avalanche diodes (SADs), which serve to attenuate or clip the surge at a prescribed threshold level and limit the extent to which the magnitude of the surge exceeds the rated line voltage.

Examples of conventional surge suppressors are illustrated diagrammatically in FIGS. 1, 2 and 3, each having a pair of input terminals 11, 12 (line and neutral, respectively) across which the line voltage VL (e.g. 110 VAC) is applied, and a pair of output terminals 21, 22, to which the power supply leads of the equipment to be protected are connected. Coupled in circuit with either one or both of the input and output terminal pairs is one or a pair of series impedance elements, such as an inductor 31 coupled in series with terminals 11 and 21 in the devices of FIGS. 1 and 3, or respective series inductors 31, 32, series-coupled between terminals 11, 21 and 12, 22 in the device of FIG. 2. Connected across the line and neutral or ground, namely between each of the respective input and output terminal pairs 11, 12 and 21, 22 are non-linear voltage-limiting devices of the type referenced above. In the surge suppressor circuits of FIGS. 1 and 2, voltage-limiting elements 51 and 52 may comprise MOVs or SADs. In the configuration of FIG. 3, a gas discharge tube 53 is additionally coupled in series with element 51 across input terminals 11-12.

In response to the application of a line voltage transient (characteristically shown at 61) across input voltage terminals 11 and 12, the non-linear voltage limiting elements operate to limit or clamp the input voltage in accordance with their rated capability, while the series inductance(s) resist the flow of current to the secondary elements 51, 52 so as to reduce the surge from a typical peak value on the order of 6 kV to a voltage level on the order of 280–330 volts, depending upon the circuit employed, as shown by the suppressed surge characteristic 62.

In the circuit of FIG. 3, for example, gas discharge tube 53 turns on when the surge voltage exceeds a value on the order of 500–600 volts. The voltage across turned-on gas discharge tube 53 drops to a value on the order of 20 volts and places clamping MOV element 51, typically rated at 95 volts, in series with the tube. With the absorbing action of inductor 31 and clamping element 52, the let-through voltage appearing across output terminals 21-22 can be reduced to a value on the order of 280 volts, which may still be larger than that tolerated by a variety of electronic systems.

SUMMARY OF THE INVENTION

Pursuant to a first aspect of the present invention, there is provided a new and improved transient voltage surge suppressor, which is capable of providing a considerable reduction in let-through voltage compared to current circuit designs, but without a substantial increase in circuit complexity and cost. For this purpose, the present invention includes a first series circuit formed of a normally-off voltage surge-responsive switching element (e.g. gas discharge tube) and a first voltage clamping device (e.g. MOV) connected across the first and second input terminals to which the line voltage is applied, so that a transient line voltage surge applied across the first and second input terminals will cause the voltage surge-responsive switching element to turn on, thereby coupling the first voltage clamping device to the first and second input terminals through the gas discharge tube.

The inventive surge suppressor further includes a second series circuit formed of a first electrical energy absorbing impedance element (inductor) and a second voltage clamping device (e.g. MOV or SAD) connected across the first voltage clamping element, thereby forming a voltage-clamping, voltage divider circuit which clamps the voltage across the first voltage clamping element at a voltage level reduced in comparison with that obtained by the first series circuit alone. Namely, since each of the first and second voltage clamping devices is coupled in common to the gas discharge tube, then when the gas discharge tube turns on, it places both voltage clamping devices in the circuit simultaneously. The first output terminal coupled to the second series circuit and the second output terminal is coupled to the second input terminal, so that with both clamping elements simultaneously placed in circuit across the line, the let-through voltage appearing across the first and second output terminals can be reduced to the voltage clamped by the voltage-clamping, voltage divider circuit (on the order of only 220 volts). To absorb the reduced (500–600 volt) spike portion of the surge at which the gas discharge tube turns on, a second electrical energy absorbing impedance element (inductor) is coupled between the second input terminal and the second output terminal, and a voltage transient reduction filter (series resistance-capacitance) is coupled across the first and second output terminals.

In operation, in response to the occurrence of a large transient voltage surge across the line voltage input terminals of a magnitude sufficient to turn on the switching element (e.g. a transient greater than 500–600 volts, such as a 6 kV transient), the gas discharge tube switching element is turned on. As a result, a portion of the transient voltage surge (e.g. on the order of 20 volts) is dropped across the gas discharge tube, while the first voltage limiting element clamps the voltage surge at a first clamping level (on the order of 270–280 volts). In addition, because the second voltage limiting element clamps a divided portion of the clamped surge voltage across the first voltage limiting element at a second clamping level less than the first clamping level, and the let-through voltage across the output terminals is referenced to the second clamping element, The let-through voltage appearing across the first and second output terminals can be reduced to a value only on the order of only 220 volts. The second inductor-resistor-capacitor circuit form a snubber which absorbs the reduced (500–600 volt) spike portion of the surge at which the gas discharge tube turns on.

In accordance with a second aspect of the present invention, an overcurrent protection device is coupled upstream of the surge suppressor circuit for the purpose of preventing damage to the surge suppressor that may be caused by excessive thermal energy buildup, associated with an overcurrent condition that lasts over a period of time, or by a large magnitude current spike capable of destroying one or more components of the suppressor and thereby preventing the suppressor from performing its intended function.

The overcurrent protection device preferably comprises an interruptable conductor coupled in circuit with the voltage surge suppressor circuit between the first and second input terminals. The interruptable conductor electrically functions as a pair of series-connected switches, physically configured as alterable conductor portions, which are electrically and physically connected in series with the surge suppressor circuit across the input terminals to which the line voltage and neutral are applied, so that a severing or interruption of either of the first and second conductor portions will effectively decouple the input terminals from the surge suppressor circuit.

The first conductor portion of the series connection is comprised of a first terminal coated with first conductor material (e.g. solder), which changes state in response to thermal energy imparted thereto as a result of an $I^2R$ heating of the solder (e.g. due to excessive current flow over a period of time as a result of a long term degradation of the non-linear clamping component (metal-oxide varistor) within the surge protection circuit).

Embedded in and thereby held fast by the solder-coated first terminal is one end of a second, translatable conductor portion, in the form of a thin, fusible wire segment, which ruptures in response to an overcurrent surge ($I^2t$) condition of at least a prescribed magnitude imparted across the input terminals. The thin, fusible wire is affixed to a spring-biased pivotable support arm, which is arranged to normally bias the fusible wire in a direction away from the solder-coated terminal, so that, in response to the solder softening sufficiently as a result of current flow-induced thermal energy imparted thereto, the thin, fusible wire will be released from the solder material and allow the pivot arm to pivot away from the solder terminal, thereby interrupting the current flow path. Similarly, in response to a transient current surge of at least a prescribed magnitude, the thin fusible wire segment will rupture, whereby the spring-biased pivotable support arm is no longer held in place by the series combination of the solder and the fusible wire, so that it rotates away from the solder terminal and interrupts the current flow path. A signalling device in the form of a microswitch is arranged to be engaged by and operated by the pivotable support arm as it pivots away from the solder terminal in response to the interruption of the current flow path.

In accordance with the operation of the overcurrent protection device, a current flow path is normally provided from the one input terminal through the series connection of the solder and fusible conductor portions to the voltage surge protection circuit, so that the surge protector may perform its intended function of reducing the magnitude of the let-through voltage to downstream electronic equipment. However, the current flow path becomes severed or interrupted in the event of either an excessive $I^2R$ thermal input, causing the solder to melt, or a massive power fault, as may be caused by a catastrophic surge component failure which contains sufficient $I^2$ T energy to rupture the fusible wire. In either event the spring biased pivotal arm is no longer mechanically restrained by the solder and fusible wire combination. so that it rotates away from the solder terminal and interrupts the insertion of the surge protector circuit across the line and neutral terminals.

DETAILED DESCRIPTION

Figure 4:
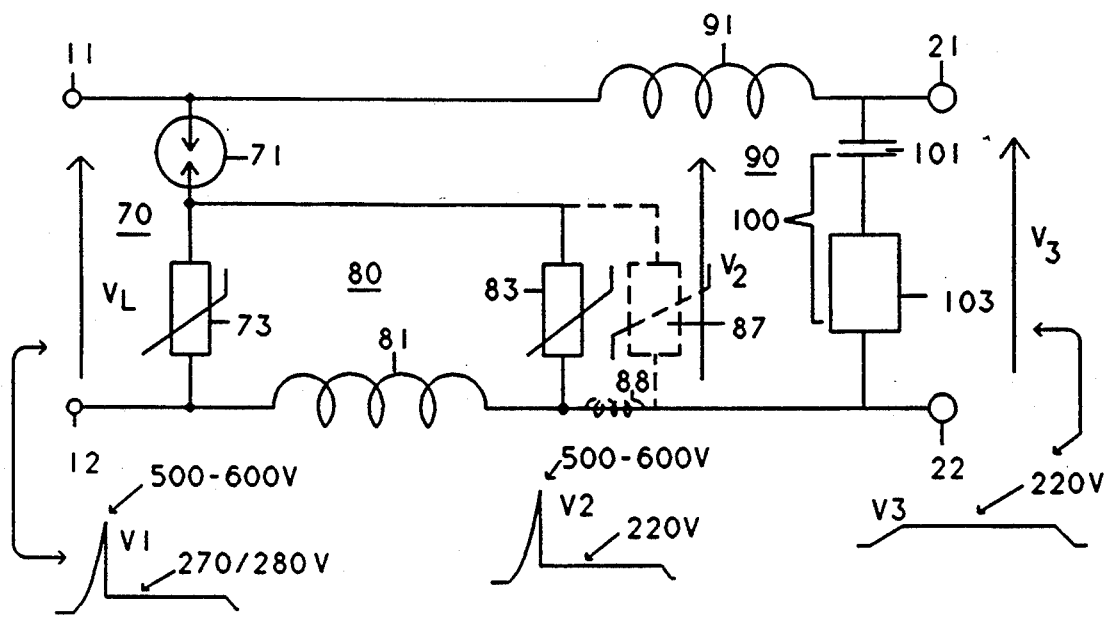
FIG. 4 is a schematic illustration of a transient voltage surge suppressor in accordance with the present invention.

FIG. 4 schematically illustrates an embodiment of the improved transient voltage surge suppressor according to the present invention which is capable of providing a considerable reduction in let-through voltage compared to current circuit designs (e.g. a reduced let-through voltage on the order of 220 volts), without a substantial increase in circuit complexity and cost. As shown in FIG. 4, the surge suppressor includes a first series circuit 70 formed of a normally-off voltage surge-responsive switching element, e.g. a gas discharge tube 71, and a first voltage clamping device (e.g. MOV) 73 connected across the first and second input terminals 11, 12 to which input voltage is applied.

Figure 3:
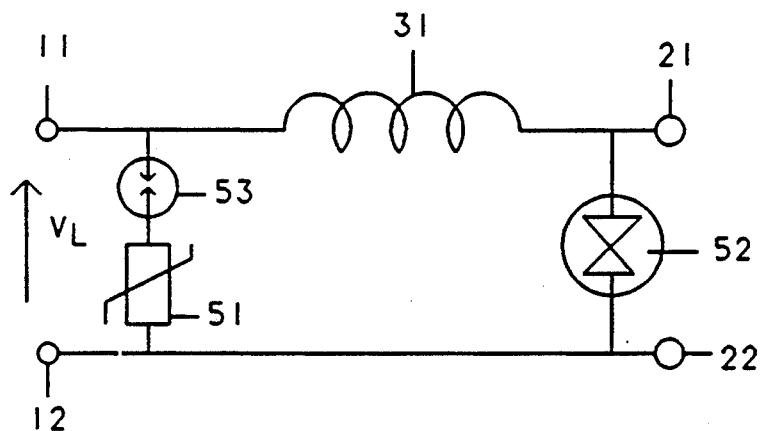

As shown by voltage surge characteristic V1, when a transient line voltage surge (e.g. on the order of 5–6 kV) is applied across input terminals 11, 12, voltage surge-responsive switching element 71 turns on when the surge reaches a value on the order of 500–600 volts and couples the MOV voltage clamping device 73 to the first and second input terminals through the gas discharge tube 71, causing the voltage V1 across input terminals 11, 12 to drop to the clamping voltage of the MOV device (on the order of 270–280 volts), as the conventional surge suppressor circuit, shown in FIG. 3, described above.

In accordance with the present invention, the surge suppressor further includes a second series circuit 80 formed of a first electrical energy absorbing impedance element (inductor) 81 and a second voltage clamping device (e.g. MOV or SAD) 83 connected across the first voltage clamping element (MOV) 73, thereby forming a voltage-clamping, voltage divider circuit, which clamps the voltage across the first voltage clamping 83 element at a voltage level reduced in comparison with that obtained by the first series circuit 70 alone, as shown by voltage characteristic V2. Namely, since each of the first and second voltage clamping devices 73 and 83 is coupled in common to the gas discharge tube 71, then when the gas discharge tube 71 turns on in response to a transient voltage surge across the line terminals 11, 12, it places both voltage clamping devices 73, 83 in the circuit simultaneously, so that the composite voltage characteristic V2 results.

In the inventive surge suppressor circuit of FIG. 4, the first output terminal 21 is coupled to connection node 85 of inductor 81 and MOV clamping device 83 of the second series circuit 80. The second output terminal 22 is coupled to the second input terminal (through an inductor 91 of a snubber circuit 90), so that with both MOV clamping elements 73, 83 simultaneously placed in circuit across the line, the let-through voltage V3 appearing across output terminals 21, 22 can be reduced to the voltage clamped by the voltage-clamping, voltage divider circuit 80, which is on the order of only 220 volts, as noted above.

To absorb the reduced (500–600 volt) spike portion of the surge at which gas discharge tube 71 turns on, (current absorbing) inductor 91 is coupled between input terminal 11 and output terminal 21, and a voltage transient reduction filter 100 containing series-connected resistance 101 and capacitor 103 is coupled across output terminals 21, 22, from which output or let-through voltage V3 is derived.

In operation, as described above, in response to the occurrence of a transient voltage surge across the line voltage input terminals 11, 12 of a magnitude sufficient to turn on the switching element (e.g. a transient greater than 500–600 volts, such as a 6 kV voltage transient), gas discharge tube switching element 71 turns on. When element 71 turns on, a portion of the transient voltage surge (e.g. on the order of 20 volts) is dropped across gas discharge tube 71, while the first voltage limiting MOV element 72 clamps the voltage surge at a first clamping level (on the order of 270–280 volts). In addition, because the second voltage limiting MOV element 83 clamps a divided portion of the clamped surge voltage across MOV 71 at a second clamping level less than the first clamping level, the let-through voltage across the output terminals is referenced to the second clamping element. Thus, the let-through voltage V3 appearing across output terminals 21, 22 can be reduced to a value only on the order of only 220 volts. The series connection of inductor 91, resistor 101 and capacitor 103 of snubber circuit 100 is tuned to filter out or absorb the reduced (500–600 volt) spike portion of the surge at which the gas discharge tube turns on, so that the let-through voltage V3 is obtained at output terminals 21, 22.

As pointed out above, the surge suppressor circuit of FIG. 4, by connecting output terminal 22 to connection node 85 of inductor 81 and MOV clamping device 83 of the second series circuit 80, and with both MOV clamping elements 73, 83 simultaneously placed in circuit across the line, the let-through voltage V3 appearing across output terminals 21, 22 can be reduced to the voltage clamped by the voltage-clamping, voltage divider circuit 80.

Figure 5:
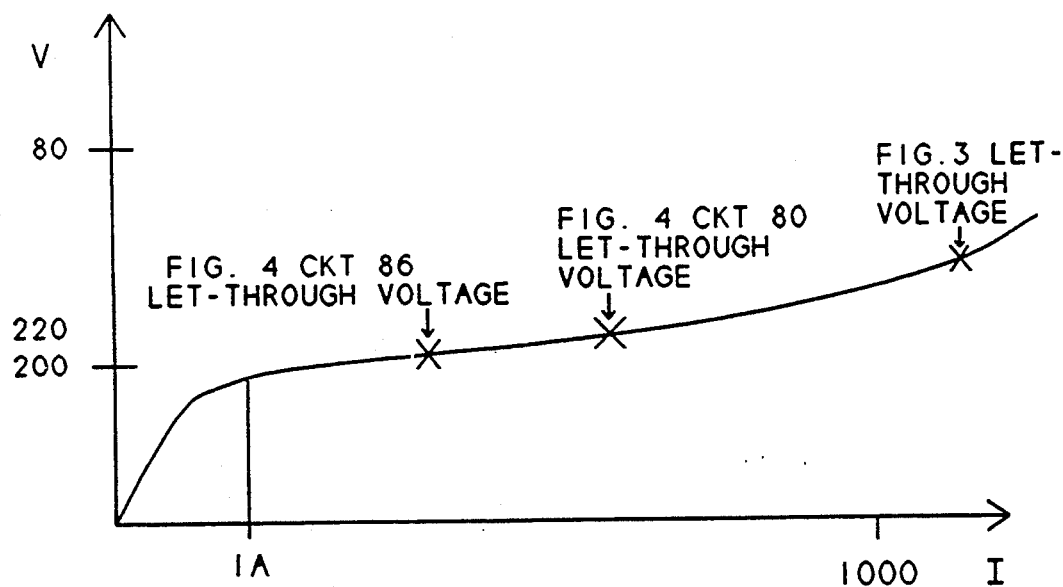
FIG. 5 shows the voltage vs. current relationship of a typical non-linear voltage limiting device.

A further reduction in the 220 volt value realized in accordance with the embodiment shown in FIG. 4 can be obtained by the addition of a further voltage-clamping, voltage divider circuit shown in broken lines at 86 as containing a non-linear, voltage clamping element (e.g. MOV) 87 and inductor 88 connected in series across MOV element 83 in the same manner that circuit 80 is connected across MOV 83, with output terminal 22 connected to node 89 between MOV 87 and inductor 88. In principal, an N number of such voltage clamping, voltage divider stages may be additionally cascaded in sequence. However, as will be understood from the voltage vs. current relationship of a typical non-linear voltage limiting device shown in FIG. 5, from a practical standpoint, the additional degree of improvement from 220V to a less value (e.g. on the order of 200–210V for the additional stage 86 of FIG. 4) involves a trade-off in circuit complexity and cost of the circuit modification.

As pointed out earlier, in addition to providing an improved voltage surge suppression circuit, the present invention provides an overcurrent protection device which is coupled in circuit with the surge suppressor circuit for the purpose of preventing damage to the surge suppressor that may be caused by either an $I^2R$ thermal condition or an $I^2t$ overcurrent condition. The thermal buildup may be caused by current leakage degradation of a voltage-limiting device (MOV) lasting over a period of time, or by a large magnitude current spike, such as caused by a lightning strike, capable of destroying (short circuiting) one or more components of the suppressor and thereby preventing the suppressor from performing its intended function.

Figure 1:
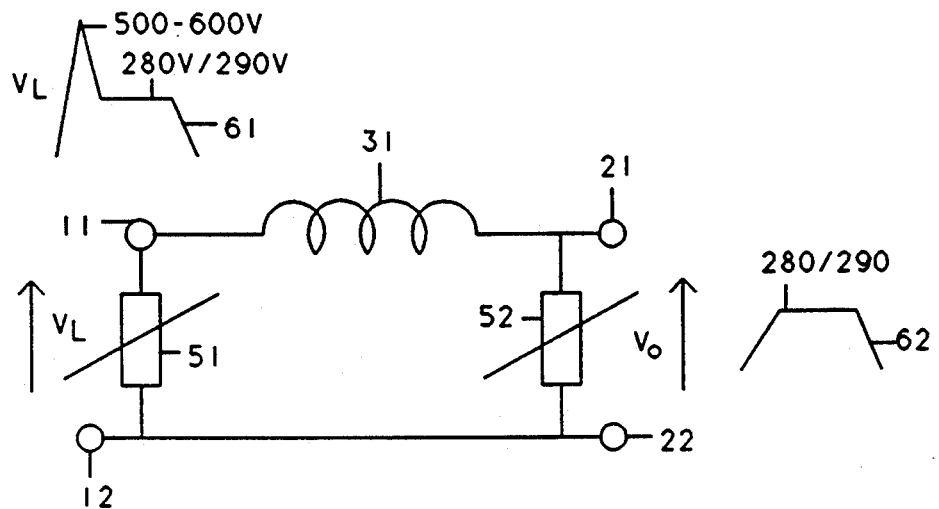
FIGS. 1, 2 and 3 are schematic illustrations of current state of the art electrical energy surge suppressors.
Figure 6:
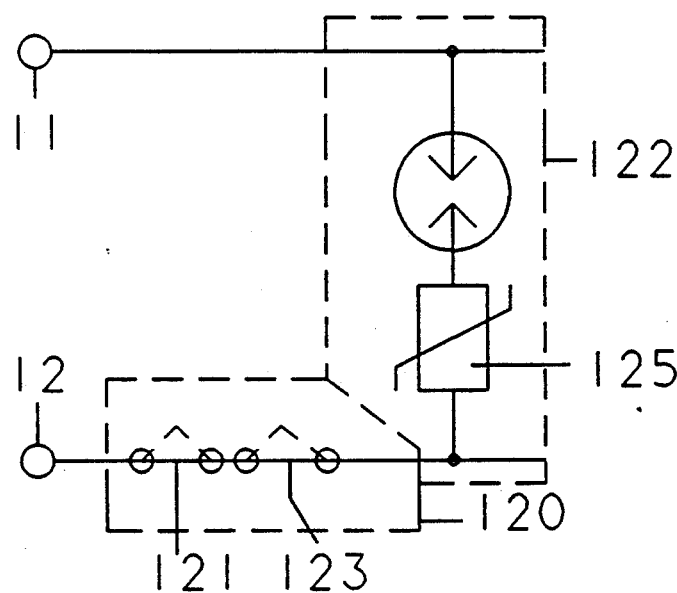
FIG. 6 is a schematic illustration of the coupling of an overcurrent protection device in circuit with a transient voltage surge suppressor across line and neutral voltage input terminals.
Figure 2:
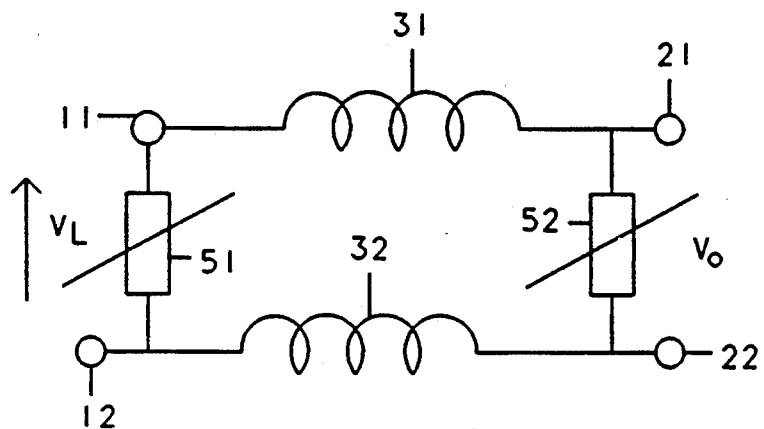
Figure 7:
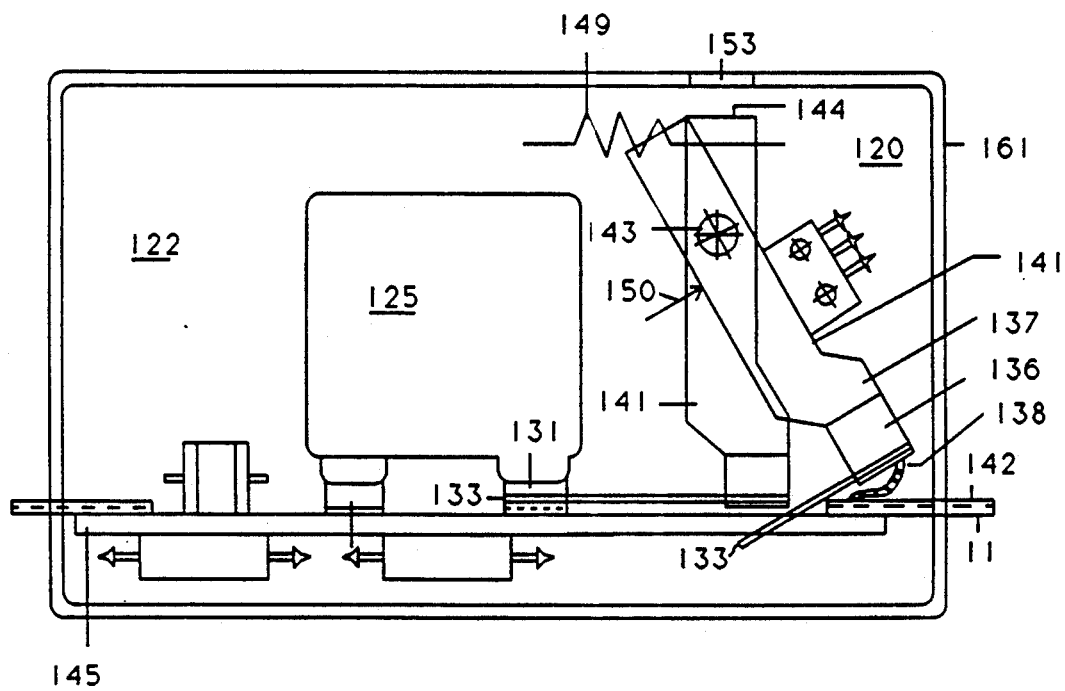
FIG. 7 is a diagrammatic side view illustration of a module which incorporates an overcurrent protection device with a transient voltage surge suppressor to be applied across line and neutral voltage input terminals.

FIG. 6 is a schematic illustration of the coupling of such an overcurrent protection device in circuit with a transient voltage surge suppressor across line and neutral voltage input terminals, while FIG. 7 is a diagrammatic illustration of a module which incorporates an overcurrent protection device with a transient voltage surge suppressor to be applied across line and neutral voltage input terminals. More particularly, the overcurrent protection device preferably comprises an interruptable conductor circuit 120 coupled with a voltage surge suppressor circuit 122 between the first and second input terminals 11, 21. Interruptable conductor circuit 120 is physically configured of first and second physically alterable conductor portions 121, 123, shown schematically in FIG. 6 as respective normally closed switches, electrically and physically connected in series with the surge suppressor circuit across the input terminals to which the line voltage and neutral are applied. The severing or interruption of either of the first and second conductor portions effectively corresponds to opening of the switches, which will effectively decouple the input terminals from the surge suppressor circuit.

The first conductor portion (or first normally closed switch) 121 of the series-connected pair is comprised of a solder-coated terminal 131 which changes state in response to thermal energy imparted as a result of an $I^2R$ heating of the solder (e.g. due to excessive current flow over a period of time, such as may be the result of a long term degradation of the non-linear clamping component (metal-oxide varistor) 125 within the surge protection circuit 122.

Embedded in and thereby held fast by the solder-coated terminal 131 is one end 133 of a second, translatable conductor portion, in the form of a thin, fusible (copper) wire segment 135. Fusible wire segment 135 ruptures in response to an overcurrent surge ($I^2t$) condition of at least a prescribed magnitude imparted across the input terminals. Wire segment 135 is affixed to a terminal 136 at the bottom end 137 of a spring-biased pivotable support arm 141. Support arm 141 is rotatable about an axis 143 and is biased in a counter-clockwise direction as viewed in FIG. 7 by a spring 149, so that fusible wire segment 135 is normally held in tension or urged in a direction away from solder terminal 131. A braided conductive (copper) link 138 is connected between terminal 136 at the bottom of pivotable support arm 141 and a conductor terminal 142, which is affixed to one end of a printed circuit board 145 upon which the circuit components of the surge suppressor 122 are mounted with the module, and which serves as one of the input terminals 11, 12 that are directly mountable to an equipment frame backplane. The length of copper braid 138 is sufficient to accommodate the pivoting range of lower end 137 of pivot arm 141.

Should the $I^2R$ current flow through the solder-coated terminal 131 increase to level that causes the solder to soften and melt, as may occur as a result of long term degradation of the MOV element 125, the spring-sourced tension in fusible wire segment 135 will cause the wire segment to be pulled away by pivot arm 141 and thereby extracted from the solder coating on terminal 131, thereby interrupting the current flow path between terminal 131 of the surge suppressor circuit and flexible braid conductor 138 to which terminal 142 is connected. Pivot arm 141 rotates in a counterclockwise direction denoted by arrow 150, until it engages a microswitch 151, which serves a signalling device to permit the operation of the circuit to be externally monitored.

In addition to the $I^2R$ melting of the solder layer on terminal 131, which allows pivot arm 141 to rotate away from terminal 131 and sever the connection to the surge suppressor circuit 122, the overcurrent protection module is also responsive to a fault current surge sufficient to rupture the thin fusible wire segment 135, which removes the electrical and mechanical connection between terminal 131 and the flexible braid 138 at the end of pivot arm 141, whereby the spring-biased pivotable support arm is no longer held in place by the series combination of the solder terminal 131 and the fusible wire segment 135, so that it rotates away from the solder terminal and interrupts the current flow path through flexible braid 138 between terminal 131 and terminal 142. Again, as pivot arm 141 rotates, it engages microswitch 151 so as to permit the operation of the circuit to be externally monitored by the closure of the microswitch's contacts.

Recounting the operation of the overcurrent protection device of FIGS. 6 and 7, a current flow path is normally provided from an input terminal to the voltage surge protection circuit through the series connection of the solder terminal 131, fusible wire segment 135 and flexible conductor braid 138 to terminal 142, so that the surge protector circuit 122 may perform its intended function of reducing the magnitude o the let-through voltage to downstream electronic equipment. However, this current flow path becomes severed or interrupted in the event of either an excessive $I^2R$ thermal input, causing the solder to melt, or a massive power fault, as may be caused by a damaged surge protection component which contains sufficient $I^2T$ energy to rupture the fusible wire segment. In either event, spring biased pivotal arm 141 is no longer mechanically restrained by the solder and fusible wire combination, so that it is urged away from the solder terminal and interrupts the insertion of the surge protector circuit across the line and neutral terminals.

To permit the state of the overcurrent protection circuit to be locally monitored, for example by service personnel, a distal end 144 of arm 141 may be color coded, so that in its normally closed state, with each of solder terminal 131 and fusible wire segment intact, distal end 144 may be directly viewed through a window 153 in a housing module 161 containing the protection circuit. When the pivot arm rotates away from its normally closed position, distal end 144 is pivoted away from window 153, so that the color within the window changes, indicating an overcurrent condition, so that the module, if defective, may be replaced.

As will be appreciated from the foregoing description, the present invention provides a transient voltage surge suppressor, which is capable of providing a considerable reduction in let-through voltage (e.g. a reduced let-through voltage on the order of 220 volts) compared to current circuit designs, without a substantial increase in circuit complexity and cost. In addition, the overcurrent protection module upstream of the surge suppressor circuit prevents damage to the surge suppressor that may be caused by excessive thermal energy buildup, associated with an overcurrent condition that lasts over a period of time, or by a large magnitude current spike capable of destroying one or more components of the suppressor and thereby preventing the suppressor from performing its intended function.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. An overcurrent protection device comprising:

first and second terminals to which a voltage is applied;

a voltage surface protection circuit arranged to be coupled in circuit with first and second terminals; and a moveable conductor element, normally providing, at a first position thereof, an electrical and physical connection between one of said first and second terminals and said voltage surge protection circuit, said moveable conductor element having a first conductive portion which changes state in response to thermal energy imparted thereto as a result of current flow therethrough, and a second conductor portion which changes state in response to a transient current surge therethrough of at least a prescribed magnitude, said moveable conductor element being normally physically biased in a direction away from said first position toward a second position spaced apart from said first position, and wherein, at said first position of said moveable conductor element, a current flow path is normally provided from said one of said first and second terminals through said first and second conductor portions of said moveable conductor element to said voltage surge protection circuit, and wherein, in response to either said thermal energy imparted to said first conductor portion of said moveable conductor element as a result of current flow through said first conductor portion of said moveable conductor element, causing said first conductor portion of said moveable conductor element to change state, or said transient current surge through said second conductor portion of said moveable conductor element, causing said second conductor portion of said moveable conductor element to change state, said movable conductor element is moved from said first position to said second position, thereby interrupting said electrical and physical connection between one of said first and second terminals and said voltage surge protection circuit.

2. An overcurrent protection device according to claim 1, wherein said moveable conductor element comprises a pivotable support arm to which said second conductor portion is attached, said second conductor portion comprising a fusible conductor link having a first portion joined to said pivotable arm and a second portion normally joined to said first conductor portion.

3. An overcurrent protection device according to claim 2, wherein said first conductor portion comprises an electrode connected to said one of said first and second terminals, and solder material formed on said electrode, and wherein said second portion of said fusible conductible link is normally electrically and mechanically joined with said solder material so as to retain said second conductor portion of said moveable conductor element in a first connection condition, at said first position thereof, in the absence of either of said first and second conductor portions of said moveable conductor element changing state.

4. An overcurrent protection device according to claim 2, further comprising a housing module containing said voltage surge protection circuit and said moveable conductor element, and wherein a first end of said pivotable support arm contains an indicator which is observable through a window in said housing module when said pivotable support arm is in a position such that said fusible conductor link is joined to said first conductor portion.

5. An overcurrent protection device according to claim 3, wherein said pivotable support arm is arranged to normally bias said fusible link in a direction away from said first conductor portion of said moveable conductor element, so that in response to said solder softening sufficiently as a result of current flow-induced thermal energy imparted thereto, said fusible link is urged away from and separates from said solder material, thereby interrupting said current flow path through of said moveable conductor element.

6. An overcurrent protection device according to claim 5, wherein said fusible link comprises a segment of fusible wire which physically ruptures in response to a transient current surge of at least said prescribed magnitude flowing through said fusible link.

7. An overcurrent protection device according to claim 5, wherein said pivotable support arm is spring-biased away from said first conductor portion of said moveable conductor element so that said fusible link is biased in a direction away from said first conductor portion of said moveable conductor element.

8. An overcurrent protection device according to claim 5, further including a signalling device arranged to be engaged by and operated by said pivotable support arm pivoting away from said first conductor portion in response to the interruption of said current flow path.

9. An overcurrent protection device according to claim 1, wherein said voltage surge protection circuit comprises a first series circuit formed of a normally-off voltage surge-responsive switching element and a first voltage clamping device connected across said first and second terminals, such that a transient voltage applied across said first and second terminals will cause said voltage surge-responsive switching element to turn on, thereby coupling said first voltage clamping device to said first and second terminals.

10. An overcurrent protection device according to claim 9, wherein said voltage surge protection circuit comprises third and fourth terminals from which a let-through voltage is derivable, a second series circuit formed of a first electrical energy absorbing impedance element and a second voltage clamping device connected across said first voltage clamping element, thereby forming a voltage-clamping, voltage divider circuit which clamps the voltage across said first voltage clamping element at a reduced voltage level, wherein said third terminal is coupled to said second input terminal and said fourth terminal is coupled to said second series circuit.

11. An overcurrent protection device comprising:
first and second terminals to which a voltage is applied;
a voltage surge protection circuit arranged to be coupled in circuit with first and second terminals;
an interruptable conductor coupled between one of said first and second terminals and said voltage surge protection circuit, said interruptable conductor comprising a fusible conductor link which ruptures in responses to a transient current surge of at least a prescribed magnitude flowing through said fusible conductor link, said fusible conductor link being configured such that a current flow path is normally provided from said one of said first and second terminals through said fusible conductor link to said voltage surge protection circuit, but is interrupted in response to said fusible link rupturing; and
a pivotable support arm to which said fusible link is attached at a first portion thereof, said fusible link having a second portion joined to one of said terminals and said voltage surge protection circuit.

12. An overcurrent protection device according to claim 11, wherein said pivotable support arm is arranged to normally bias said fusible link in a direction away from the solder-connection of said second portion of said fusible link to said voltage surge protection circuit, so that in response to said solder softening sufficiently as a result of current flow-induced thermal energy imparted thereto, said fusible link is urged away from and separates from said solder material, thereby interrupting said current flow path.

13. An overcurrent protection device according to claim 12, further comprising a housing module containing said voltage surge protection circuit and said interruptable conductor, and wherein a first end of said pivotable support arm contains an indicator which is observable through a window in said housing module when said pivotable support arm is in a position such that said fusible link is solder-connected to said voltage surge protection circuit.

14. An overcurrent protection device according to claim 13, wherein said first portion of said fusible link is electrically connected to said one of said terminals and said second portion is solder-connected to said voltage surge protection circuit.

15. An overcurrent protection device comprising:
a first terminal;

a second terminal; and a moveable conductor element, normally providing, at a first position thereof, an electrical and physical connection between said first and second terminals, said moveable conductor element having a first conductor portion which changes state in response to thermal energy imparted thereto as a result of current flow therethrough, and a second conductor portion which changes state in response to a transient current surge therethrough of at least a prescribed magnitude, said moveable conductor element being normally physically biased in a direction away from said first position toward a second position spaced apart from said first position, and wherein, at said first position of said moveable conductor element, a current flow path is normally provided between said first and second terminals through said first and second conductor portions of said moveable conductor element, and wherein, in response to either said thermal energy imparted to said first conductor portion of said moveable conductor element as a result of current flow through said first conductor portion of said moveable conductor element, causing said first conductor portion of said moveable conductor element to change state, or said transient current surge through said second conductor portion of said moveable conductor element, causing said second conductor portion of said moveable conductor element to change state, said moveable conductor element is moved from said first position to said second position, thereby interrupting said electrical and physical connection between said first and second terminals.

16. An overcurrent protection device according to claim 15, wherein said moveable conductor element comprises a pivotable support arm to which said second conductor portion is attached, said second conductor portion comprising a fusible conductor link having a first portion joined to said pivotable arm and a second portion normally joined to said first conductor portion, and wherein said first conductor portion comprises an electrode connected to said first terminal, and solder material formed on said electrode, and wherein said second portion of said fusible conductible link is normally electrically and mechanically joined with said solder material so as to retain said second conductor portion of said moveable conductor element in a first connection condition at said first position thereof, in the absence of either of said first and second conductor portions of said moveable conductor element changing state.

17. An overcurrent protection device according to claim 16, wherein said pivotable support arm is arranged to normally bias said fusible link in a direction away from said first conductor portion of said moveable conductor element, so that in response to said solder softening sufficiently as a result of current flow-induced thermal energy imparted thereto, said fusible link is urged away from and separates from said solder material, thereby interrupting said current flow path through of said moveable conductor element.

* * * * *